United States Patent [19]
Wakefield

[11] Patent Number: 5,745,565
[45] Date of Patent: Apr. 28, 1998

[54] COMBINATION CUP AND CELLULAR PHONE HOLDER

[75] Inventor: Ivan Nelson Wakefield, Cary, N.C.

[73] Assignee: Ericsson Inc., Research Triangle Park, N.C.

[21] Appl. No.: 643,705

[22] Filed: May 6, 1996

[51] Int. Cl.$^6$ .................. H04M 1/00; A47K 1/08
[52] U.S. Cl. ............... 379/446; 379/455; 379/426; 248/311.2
[58] Field of Search ............... 379/446, 455, 379/426, 454, 449; 455/90, 575; 248/311.2, 312, 311, 230

[56] References Cited

U.S. PATENT DOCUMENTS

| | | | |
|---|---|---|---|
| D. 311,919 | 11/1990 | Klaczak | D14/250 |
| D. 316,999 | 5/1991 | Sarf | D14/253 |
| D. 327,070 | 6/1992 | Watanabe | D14/251 |
| D. 360,524 | 7/1995 | Snyder | D3/224 |
| 4,821,931 | 4/1989 | Johnson | 224/42.42 |
| 5,038,982 | 8/1991 | Salveson | 224/42.11 |
| 5,230,016 | 7/1993 | Yasuda | 379/58 |
| 5,588,055 | 12/1996 | Williamson et al. | 379/446 |

FOREIGN PATENT DOCUMENTS

| | | | |
|---|---|---|---|
| 1115669 | 1/1982 | Canada | 224/22 |
| 03276832 | 9/1991 | Japan | B60N 3/10 |
| 4037237A | 7/1992 | Japan . | |
| 05112181 | 7/1993 | Japan | B60R 7/04 |

Primary Examiner—Jack Chiang

[57] ABSTRACT

A combination beverage and cellular phone holder adapted for insertion into an existing vehicle beverage holder to convert it to a multi-unit holder and firmly position the cellular phone within the vehicle in a convenient and accessible position.

6 Claims, 2 Drawing Sheets

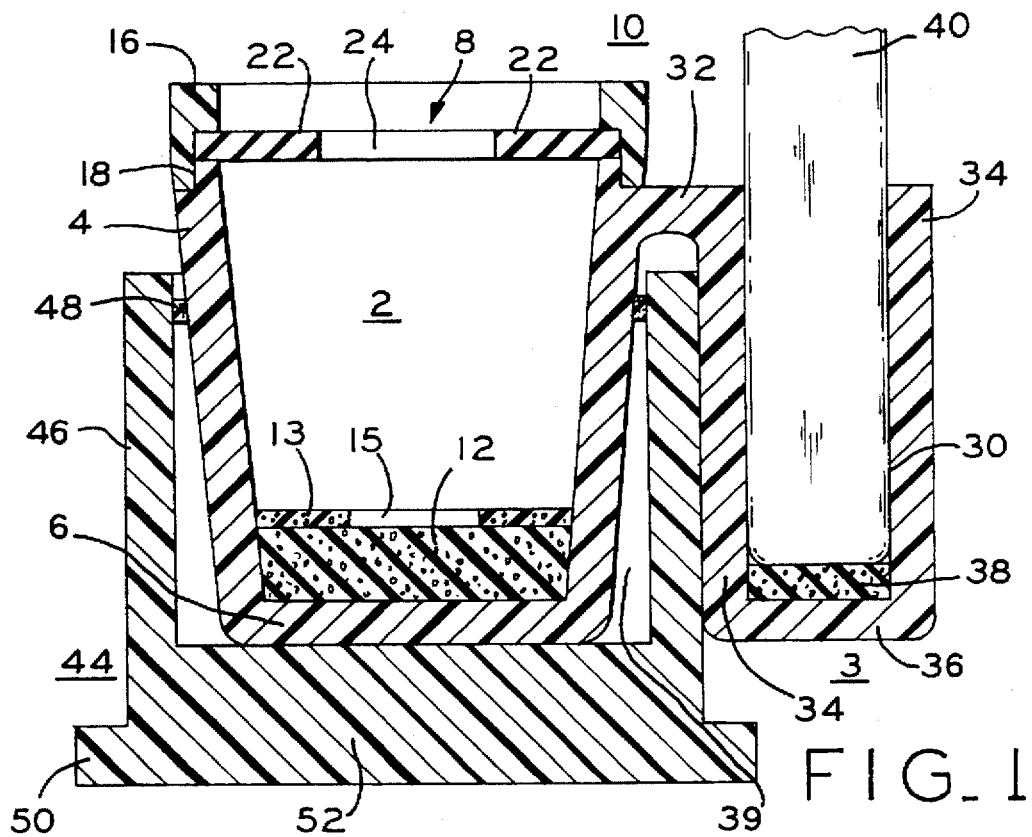
FIG_1
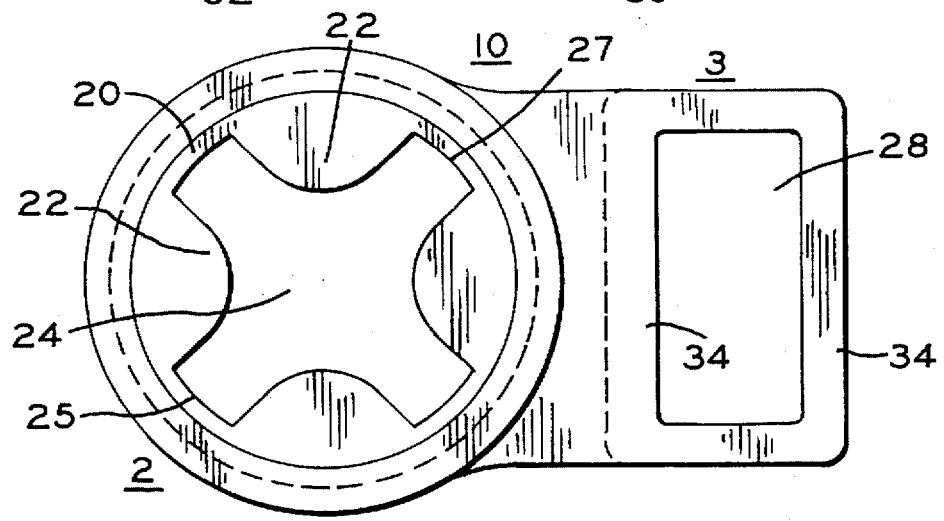
FIG_2

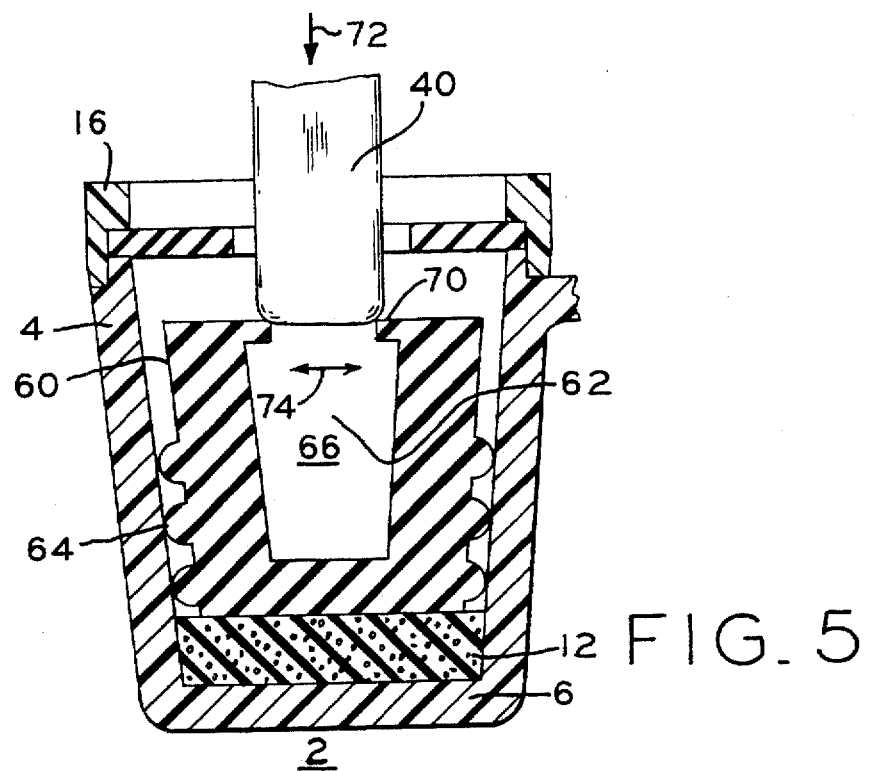
FIG. 4
FIG. 5
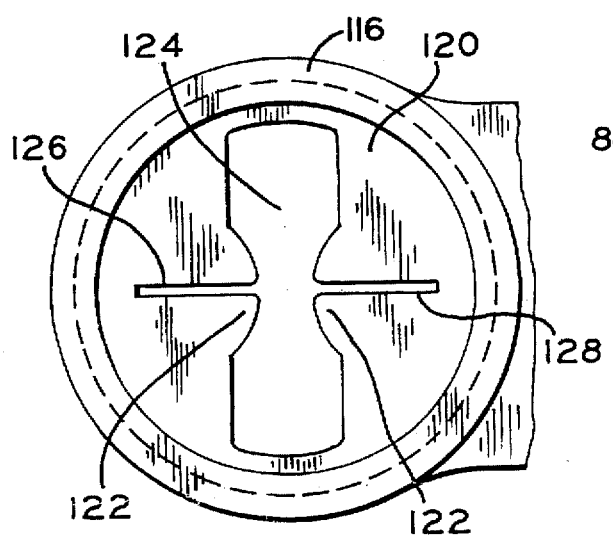
FIG. 3
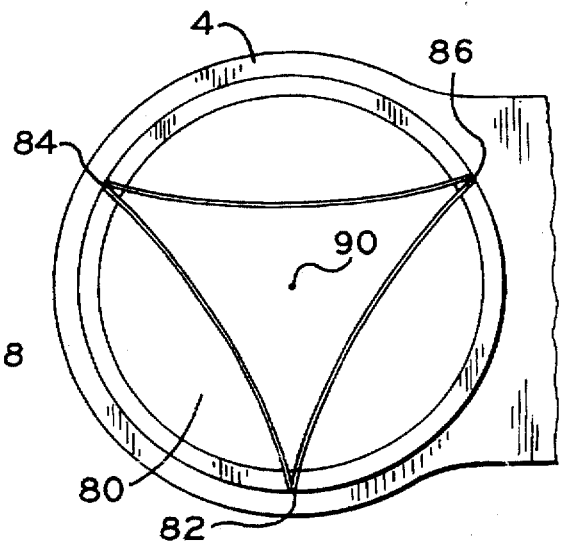
FIG. 6

5,745,565

COMBINATION CUP AND CELLULAR PHONE HOLDER

BACKGROUND OF INVENTION

Personal use portable communicators such as cellular telephones have become increasingly popular, miniaturized and ubiquitous. It has become common for portable cellular telephones to be carried in automobiles for emergency and other use. Moreover, it has also become common for people to utilize cellular telephones during operation of the automobile including not only during stops at traffic lights but also during motion of the vehicle. As a result, the problem of positioning a cellular telephone or other portable communicator in a position readily available to the driver has presented a problem not only of convenience but of safety in that drivers who are forced to divert their gaze from the road to locate and grasp a cellular telephone present traffic hazards not only to themselves but to persons in other vehicles.

While new automobile designs have included cellular telephones positioned on and secured by special holders or cradles on the console or in other fixed positions within convenient reach of the vehicle operator, many vehicles are not so equipped such that the driver often gropes for the cellular telephone positioned on the seat, floor or the glove compartment. It is accordingly desirable to be able to retrofit vehicles such as automobiles with a stationary holder for a cellular telephone which is positioned within easy reach of the driver and which provides a positive holding force to retain the cellular telephone in the holder. It is important that the driver be able to retrieve and reposition the cellular telephone in the holder without diverting his gaze from the road ahead, particularly under driving or traffic conditions.

OBJECTS AND SUMMARY OF THE INVENTION

Accordingly it is an object of the present invention to provide a conveniently positionable readily accessible cellular phone holder for use in vehicles.

It is another object of the present invention to provide a combination beverage and cellular phone holder suitable for selectively replacing a vehicle beverage holder.

It is still another object of the present invention to provide a combination beverage and phone holder which may be readily retrofitted onto existing vehicles.

In order to obtain the above and other related objectives, in carrying out the present invention in one form thereof, a combination beverage and cellular phone holder is provided for insertion into and retention by existing beverage holders and including an integral beverage portion and cellular phone portion each forming a pocket with an opening at the top and with the beverage holder dimensioned for insertion into and retention by existing beverage holders. A flexible partial closure at the upper end provides retaining means for the beverage or phone. More particularly, the walls of the replacement beverage holder may be tapered and the bottom of the replacement beverage cup holder weighted to provide positive positioning and retention of the combination holder. A spring loaded compressible insert provides tension around the cellular phone to positively hold the phone in position on the phone holder.

BRIEF DESCRIPTION OF DRAWINGS

FIG. 1 is a cross section view of the invention positioned within an existing beverage holder.

FIG. 2 is a top view of FIG. 1 without the existing beverage holder and without the cellular phone in order to better illustrate details of the present invention.

FIG. 3 shows an alternate configuration for the resilient seal used on the replacement beverage holder.

FIG. 4 shows a portion of the tapered walls of the replacement beverage holder of FIG. 1.

FIG. 5 is a cross section view showing details of a resilient retention arrangement suitable for use with the invention of FIGS. 1-4.

FIG. 6 is an alternate spring arrangement for the retaining spring shown in FIG. 5.

Referring first to FIGS. 1 and 2, combination beverage and phone holder 10 including a beverage holder 2 and phone holder 3 with side walls 4 which may be tapered and bottom 6 providing open top end 8. Open end 8 is partially closed by resilient member 20 which is secured in place by retaining rim 16 and cooperating portion 18 on the upper portion of side walls 4 which may include protrusions for a snap fit or which could utilize threads. Resilient member 20 may be configured as shown in FIG. 2 including a plurality of resilient protrusions or fingers 22 defining a deformable central opening 24 suitable for receiving and securing a beverage can or a cup containing a beverage. Alternatively, the diagonally opposed rim segments or sections 25 and 27 define a generally rectangular opening suitable for retaining a cellular telephone in the position determined by the existing vehicle beverage holder 44 in the convenient, accessible to the driver position of that beverage holder.

Connected to, and integral with, beverage or cup holder 2 is cellular phone or portable communication unit holder 3 connected by bridging member 32 all of which may be cast in an integral form of a suitable material such as a thermoplastic rubber such as that sold and identified as Santoprene. Phone holder 3 defines a central pocket 28 (see FIG. 2) of generally rectangular cross section formed by side walls 34 and bottom 36. A resilient cushioning member 38 positioned above bottom 36 (see FIG. 1) provides a resilient resting base for portable communication unit 40 which may be a cellular phone or radar detector. A similar foam rubber cushion 13 may be provided in the bottom of beverage holder 2 and may include a slot 15 for receiving the bottom of cellular phone 40 in those situations where the cellular phone is inserted into beverage holder 2 between diagonally opposed rim segments 25 and 27. It is, of course, possible that because of the optimum existing positioning of automotive cup holder 44 in the vehicle that it may be desirable to position cellular phone 40 in the same position within beverage holder 2 in which case it is centered and retained by resilient member 20 and slot 15.

Combination beverage and phone holder 10 is positioned on, and secured by, existing automotive cup holder 44 which includes side walls 46 and bottom 52 with a resilient member 48 adjacent the open end thereof. Automotive cup holder 44 may include slide or support 50 for anchoring and/or moveably supporting automotive cup holder 44 adjacent the driver's position such as on a console. It is to be noted that beverage holder 2 is inserted within automotive cup holder 44 with phone holder 3 positioned adjacent or outside walls 46 of the automotive cup holder with bridge member 32 overlying the top and open end of the automotive cup holder. A generally U-dash shaped opening or separation 39 formed by sidewall 4 of beverage holder 2 and sidewall 34 of phone holder 4 connected at the top by bridge member 32 in effect straddle sidewall 46 of automotive cup holder 44 securing combination beverage and phone holder 10 in place and in effect supplanting or retrofitting automotive cup holder 44 and replacing it with combination beverage and phone holder 10. It is possible, as described above, to utilize beverage holder 2 to retain cellular phone 40 such that if it is not desired to simultaneously provide both a beverage holder and phone holder, phone holder assembly 3 can be dispensed with.

An alternate configuration of resilient member 20 is shown in FIG. 3. Referring to FIG. 3, resilient member 120 secured in place by threaded rim 116 includes protrusions or fingers 122 configured to provide a generally rectangular central slot 124 with narrow orthoganal slots 126 and 128 providing a design that can more readily grip and position a cellular telephone. This design may be desirable if phone holder 3 is not included.

As shown in FIG. 4, sidewalls 4 of beverage holder 2 may include a plurality of circumferential ridges 56 extending in a generally horizontal position between sidewalls 52 and 54 having slightly differing diameters, with the diametere of sidewall 54 being slightly less than the diameter of sidewall 52. Such a configuration may assist in the positive positioning of beverage holder 2 within resilient member 22 of cup holder 44.

Referring next to FIG. 5. FIG. 5 shows details of a spring retention suitable for use with the invention of FIGS. 1–4. A tapered insert 60 is positioned within interior 62 of cup holder 4 proximate to bottom 6 of the cup holder and secured to weighted bottom member 12. Tapered insert 60 is formed of resilient material such as Santoprene. Ridges 64 around the bottom region 66 of the interior of insert 60 contact the interior surface of side walls 4 to secure insert 60 in place. Rim 70 at the open upper end of insert 60 projects inwardly such that the insertion downward of transceiver 40 as indicated by arrow 72 presses against the rim forcing the opposing portions of the rim apart as indicated by arrow 74 providing a positive holding force for transceiver 40 when inserted into and positioned within and contacting the interior walls of the bottom portion of tapered insert 60.

Referring next to FIG. 6. Insert 60 is replaced by one or more springs 80 which can be a single length of spring material secured at points 82, 84 and 86 about axis 90 equidistant from each other along the interior of side walls 4. The deformation of spring 80 upon the insertion of transceiver 40 will cause the spring to resiliently hold the transceiver within side walls 4 to provide a positive holding force.

While the present invention has been described with respect to certain preferred embodiments thereof, it is to be understood that numerous variations in the details of construction, the arrangement and combination of parts, and the type of materials used may be made without departing from the spirit and scope of the invention.

What I claim is:

1. A combination beverage and portable communication unit holder for insertion into an existing vehicle beverage holder having side walls comprising:

an integral beverage holder portion and portable communicator holder portion;

said beverage holder portion including outer walls with an opening at the upper end and dimensioned for insertion and retention in said vehicle beverage holder;

said portable communicator holder portion including a holding pocket with an opening at the upper end hereof;

a connector joining said open end of said beverage holder portion to the open end region of said portable communicator holder portion with a space between said beverage holder and portion and said portable communicator holder portion below said connector dimensioned to slip over said side walls of said existing vehicle beverage holder;

said beverage holder portion being dimensioned to enable insertion into said existing vehicle beverage holder to provide a nested beverage holder with adjacent portable communication holder.

2. The combination holder of claim 1 wherein resilient members extend from the edges of said open end of said beverage holder portion toward the central region of said open end to contact and restrain a beverage container inserted into said central region of said beverage holder portion.

3. The combination of holder of claim 2 wherein said outer walls of said beverage holder portion are tapered and include at least one circumferential ridge dimensioned to contact said existing beverage holder to assist in securing said combination holder in position on said vehicle beverage holder.

4. The combination holder of claim 3 wherein said resilient members comprise extensions from a circular portion of generally O-Ring configuration extending radially inward toward said central region.

5. The combination holder of claim 1 wherein said outer walls of said beverage holder portion are tapered with the upper end having a larger diameter and a weighted bottom of said beverage holder portion.

6. The combination holder of claim 5 wherein said portable communicator is a cellular telephone.

* * * * *